United States Patent [19]
Uehara et al.

[11] Patent Number: 5,506,297
[45] Date of Patent: Apr. 9, 1996

[54] RESIN COMPOSITION AND MELT-EXTRUDED ARTICLE FORMED THEREFROM

[75] Inventors: Tsutomu Uehara; Yasushi Ogino; Tomonori Hosoda, all of Ibaraki, Japan

[73] Assignee: Kureha Kagaku Kogyo Kabushiki Kaisha, Tokyo, Japan

[21] Appl. No.: 352,801

[22] Filed: Dec. 1, 1984

[30] Foreign Application Priority Data

Dec. 21, 1993 [JP] Japan .................................. 5-345333

[51] Int. Cl.$^6$ ........................... C08L 29/02; C08L 29/04
[52] U.S. Cl. ..................... 525/57; 524/377; 524/320; 524/386; 524/388; 525/56
[58] Field of Search .................. 525/57, 56; 524/377, 524/320, 386, 388

[56] References Cited

U.S. PATENT DOCUMENTS

| | | | |
|---|---|---|---|
| 3,366,592 | 1/1968 | Beeman | 260/33.4 |
| 4,073,733 | 2/1978 | Yamauchi et al. | 210/500 M |
| 4,206,101 | 6/1980 | Wysong | 260/23 R |
| 4,215,169 | 7/1980 | Wysong | 428/220 |
| 5,270,372 | 12/1993 | Hirose et al. | 524/377 |

FOREIGN PATENT DOCUMENTS

| | | |
|---|---|---|
| 0389695 | 10/1990 | European Pat. Off. . |
| 0454850 | 11/1991 | European Pat. Off. . |
| 0524823A2 | 1/1993 | European Pat. Off. . |

*Primary Examiner*—W. Robinson H. Clark
*Attorney, Agent, or Firm*—Nixon & Vanderhye

[57] ABSTRACT

Resin compositions, melt-extruded articles, oriented articles and packaging materials for foods obtained from these articles are disclosed. The resin composition includes: (a) from 40 to 80% by weight of a PVA (A) having a degree of saponification of from 60 to 95 mole % by weight, (b) from 5 to 40% by weight of EVOH (B), (c) from 1 to 15% by weight of a thermoplastic resin (C) having a softening temperature not higher than 130° C. and (d) from 5 to 15% by weight of a PEG (D), the total of (A), (B), (C) and (D) being 100% by weight.

10 Claims, No Drawings

RESIN COMPOSITION AND MELT-EXTRUDED ARTICLE FORMED THEREFROM

BACKGROUND OF THE INVENTION

1. Technical Field of the Invention

The present invention relates to a resin composition, a melt-extruded article, an oriented article and a packaging material for foods obtained from these articles and furthermore relates to a process for producing such resin compositions. More particularly, the present invention relates to a resin composition including a polyvinyl alcohol resin (herein after abbreviated as "PVA") and specific compounds, and furthermore to a melt-extruded article, an oriented article, a film article and a food packaging film obtained from this resin composition, which have an excellent selectivity in gas permeability.

2. Description of the Prior Art

The food packaging industry requires packaging materials for various kinds of foods. For example, cheese products such as processed cheese, which are a type of fermented foodstuffs, have been conventionally coated with wax. Also plastic materials have been used to improve the appearance and to preserve the eatable portion.

Nowadays, there is a need for packaging materials for natural cheese. The natural cheese contains live bacteria to permit the ripening, and these bacteria generate carbon dioxide not only during the ripening step, but throughout the later stages such as distribution. Accordingly, if an ordinary gas impermeable plastic bag is used in packaging such cheese, the packaged bag will swell up with generated carbon dioxide and the bag is likely to break. Further the quality of the cheese will be deteriorated.

On the other hand, since oxygen accelerates the growth of molds and oxidizes the fat content of the cheese, packaging materials less permeable to oxygen gas have been desired for cheese packaging.

Packaging materials that are readily permeable to carbon dioxide, but less permeable to oxygen have been desired for preserving not only fermented foodstuffs such as cheese and miso, but also coffee beans. Generally, however, plastic packaging materials having higher gas transmission rate (hereinafter abbreviated as "GTR") to carbon dioxide also, almost without any exception, have a higher GTR to oxygen. Thus a need exists for a packaging material that has a low oxygen GTR and a high ratio of carbon dioxide GTR to oxygen GTR (hereinafter abbreviated as CO2/O2 GTR ratio).

U.S. Pat. No. 4,073,733 describes a process for producing a water permeable membrane by coagulating polyethylene glyco-containing PVA in a liquid phase. The resulting membrane is highly permeable to substances of intermediate molecular weight such as urea and vitamin B12 in a liquid phase. The products of this patent are not described as useful for food packaging materials for which selective gas permeability is required.

European published patent application 524,823 describes a resin composition containing PVA, polyethylene glycol (hereinafter abbreviated as "PEG") and a saponified copolymer of an ethylene and a vinyl acetate (hereinafter abbreviated as "EVOH"). Although a certain level of selective gas permeable film for food packaging was attained by a film formed from the resin composition of this disclosure, film-forming properties were poor due to the hardness of the resin composition itself.

Prior to the present invention the art has not provided packaging materials for fermented foodstuffs such as cheese products, and for coffee beans, having a higher carbon dioxide GTR and a lower oxygen GTR, and furthermore resin compositions for packaging material having excellent formability in the film producing process have also been required.

SUMMARY OF THE INVENTION

The first aspect of present invention is a resin composition containing (a) from 40 to 80% by weight of a PVA (A) having a degree of saponification of from 60 to 95 mole % by weight, (b) from 5 to 40% by weight of EVOH (B), (c) from 1 to 15% by weight of a thermoplastic resin (C) having a softening temperature not higher than 130° C. and (d) from 5 to 15% by weight of a PEG (D). The total of (A), (B), (C) and (D) is 100% by weight.

The second aspect of present invention is a melt-extruded article and an oriented article obtained from the above described resin composition such as a film, a sheet or a tray for packaging especially for foods, and further includes a packaging article for cheese products.

The third aspect of present invention is a process for producing a resin composition by adding a preliminarily mixed composition of EVOH (B) and a thermoplastic resin (C) to PVA (A) and PEG (D) or adding the preliminarily mixed composition of (B) and (C) to a mixed composition of resin (A) and (D).

DETAILED DESCRIPTION OF THE INVENTION

The degree of polymerization of PVA used in the present invention is preferably not less than 300 from the viewpoint of the strength of the film obtained from the resin composition mentioned in the following, and preferably not more than 3500 from the viewpoint of the processability of the resin composition, particularly preferably in the range of 500 to 2000 as measured according to JIS K6726.

The degree of saponification of PVA is from 60 to 95 mole %, more preferably 60 to 90 mole %, and particularly preferably 60 to 80 mole %. The PVA having a degree of saponification not less than 60 mole % reduces the oxygen GTR of the obtained article, and PVA having a degree of saponification of not more than 95 mole % keeps the saturated solubility of the PEG to the PVA from being reduced excessively. It is mainly PVA that dissolves PEG which is one of the components of the present invention. The saturated solubility of PEG to PVA decreases with an increase in the degree of saponification of PVA. Further, PVA having a degree of saponification of not more than 95 mole % is preferable in that it has a wide temperature difference between the melting temperature and the thermal decomposition initiating temperature, namely, the processable temperature range.

The melt viscosity of the EVOH used in the present invention is preferably in the range of $1.0 \times 10^3$ to $3.0 \times 10^4$ poise at 210° C. and a shear rate of $10^2$ sec$^{-1}$ to provide the desired processability and oxygen barrier properties. The ethylene content of the EVOH is preferably in the range of 20 to 55 mole % and particularly preferably from 20 to 45 mole %. The degree of saponification of the EVOH is not less than 90 mole % and preferably not less than 95 mole %.

The softening temperature of the thermoplastic resin used in the present invention is not higher than 130° C., preferably not higher than 110° C. and particularly preferably not higher than 100° C. There is no particular limitation with respect to the choice of thermoplastic resin in the present invention. Examples of suitable thermoplastic resins include elastomers such as a copolymer of styrene-isoprene-styrene and a copolymer of styrene-butadiene-styrene: polyolefin resins such as a polyethylene or a polypropylene: a copylymer of ethylene and vinyl acetate, and a copolymer of ethylene and acrylic acid: and an acid-grafted polymer thereof such as a polyolefin grafted with a maleic anhydride, and a polyolefin modified with a polyamide such as an ionomer grafted with a polyamide.

There is also no particular limitation of the PEG used in the present invention. The PEG having an average molecule weight in the range of about 400 to about 2000 is preferably used, since the loss of PEG contained in the film due to evaporation during the melt-extrusion process is less and furthermore it is preferable from the view point of the miscibility with the PVA.

The resin composition of the present invention includes as essential components PVA (A), an EVOH (B), a thermoplastic resin (C) and a PEG (D), as mentioned above. Each present within specified ranges, the total being 100% by weight. The PVA is in the range of from 40 to 80% by weight, preferably 50 to 80% by weight. The EVOH is from 5 to 40% by weight, preferably 10 to 40% by weight. The thermoplastic resin having a softening temperature not higher than 130° C. is from 1 to 15% by weight, preferably 2 to 10 % by weight. The PEG is from 5 to 15% by weight, preferably 7 to 13% by weight.

In addition to above four components, the resin composition of the present invention may include, if necessary, various other additives customarily used in such resin formulations including stabilizers, anti blocking agents, lubulicants, colorants and fillers to the extent that they do not impair the effect of the present invention.

To produce a resin composition of the present invention, it is preferable to dry blend the thermoplastic resin (C) having a softening temperature not higher than 130° C. with EVOH (B) first and then add this blended composition to the other components. There is no limitation with respect to the method for mixing EVOH (B) and the thermoplastic resin (C). For example, it is preferable to melt knead the dry blended composition by melt extrusion using a twin screw extruder or a single screw extruder and then pelletize the melt kneaded composition. The blended composition of EVOH (B) and the thermoplastic resin (C) so prepared preferably has a yield stress at 90° C. (hereinafter described as "yield stress") according to the measuring method of JIS K7127 (mentioned later) of not more than 85%, particularly preferable 80%, of the value of EVOH (B) alone.

A feature of the present invention is to provide a resin composition having good processability due to a lower tensile stress by including the thermoplastic resin (C) having a softening point of not higher than 130° C.

The present invention is applicable to both oriented and non-oriented articles. The products may be oriented by conventionally available procedures. In the case of inflation stretching, a bubble can be formed steadily by balancing the inside pressure of the bubble and the tensile-stress of the film of the bubble, and the stretching is facilitated. Resin compositions of the present invention having lower tensile-stress can maintain the inside pressure of a bubble low so that the stretching is made easily.

According to the present invention, yield stress is taken as an indication of the tensile stress of the resin composition. Since the stretching temperature ranges from 70° to 120 ° C., the thermoplastic resin (C) is preferably selected from resins which soften in this temperature range.

There is no limitation with respect to the method for mixing PVA (A), the blended composition of EVOH (B) and the thermoplastic resin (C), and PEG (D). For example, it is preferable to blend the PVA (A), which is impregnated with PEG (D) preliminarily, with the blended composition of EVA (B) and the thermoplastic resin (C). In the case of a PEG being solid at the room temperature, these three components may be blended respectively.

The resin compositions of the present invention may be formed into articles such as films. It is preferable to use the resin composition in pelletized form preliminarily with a twin screw extruder which is equipped with a pelletizer to obtain an article such as a film.

Pellets of the resin composition of the present invention are conveniently formed into articles such as a film, a tray, a sheet or the like. While melt extrusion molding, injection molding and stretching molding are applicable to the resin compositions of the present invention, there is no limitation with respect with the forming method employed. Compression molding, extrusion molding with a T-die, coextrusion with a circular die and deep draw molding are suitable. Particularly, in cases where laminated films are formed, extrusion lamination, dry lamination and coextrusion lamination may be employed. Films may be monoaxially or biaxially stretched by inflation or tentering. The stretching is carried out at a heating temperature of 70° to 120° C. and the film is stretched 2 to 3 times respectively in the longitudinal and transverse directions. Heating may be accomplished by using a hot water bath type and a hot dry gas type heater; there is no limitation with respect to the particular heating method employed. The film thickness of the resin composition of the present invention is generally from 2 to 50 µm, preferably from 3 to 50 µm, although the optimal thickness varies with whether the film produced from the resin composition of the present invention is used independently, or the film produced from the resin composition of the present invention is used as the core layer for producing a laminated multilayer film with layers made from other kinds of resins. With respect to the thickness of the laminated multilayer film, the film is formed so that the total thickness of the laminated multilayer film will be from 30 to 200 µm, preferably from 50 to 100 µm, although there is no limitation with respect to the total thickness of the laminated multilayer film.

In cases where the foodstuff to be packaged generates carbon dioxide gas in large amounts and does not tolerate extensive exposure to oxygen such as cheese products, coffee beans and the like, it is preferable that the oxygen GTR of the packaging film inclusive a laminated multilayer film comprising the composition of the present invention is not more than 500 cc/m$^2$.day.atm. (23° C., at 80% relative humidity [hereinafter abbreviated as RH]), preferably not more than 400 cc/m$^2$.day.atm. (23° C., at 80% RH) , and has a $CO_2/O_2$ GTR ratio of more than 5, and preferably more than 7.

Although the resin composition of the present invention may be used as a single layer it is particularly preferable, for the purpose of improving water repellency and heat sealability and securing a practical strength, that the resin composition be used in the form of a laminated multilayer film with other thermoplastic resin layer or layers.

For the film lamination, a two layer laminate film may be formed with a core layer comprising the inventive resin composition and the other layer comprising another thermoplastic resin or three layers or more layer laminated film may be formed with a core layer comprising the inventive resin composition and the other layers disposed on the both surfaces of the core layer.

In cases where other thermoplastic resins are laminated onto the both sides of the core layer, the resins of such layers may be of same kind of resin or different kinds of resin. However, it is preferable that a resin is used possessing heat sealable properties for the innermost layer of the intended packaging material and a resin which imparts a reinforcing effect be used for the outer layer.

For the thermoplastic resin layer laminated onto the core layer, resins that do not impair the selective gas permeability of the core layer are selected, in particular, a thermoplastic resin layer having $O_2$ GTR of not less than 1000 cc/m$^2$.day.atm, 30 μm thickness, (23° C., at 80% RH).

Suitable thermoplastic resins which may be laminated onto the core layer include at least one copolymer of ethylene with comonomers selected from ethylacrylate, methylmetacrylate and acid modified products of thereof, olefin polymer resins such as a copolymer of ethylene and vinylacetate, low density polyethylene (manufactured by a high pressure process), linear low density polyethylene (LLDPE), polypropylene and ionomer and further polyamide resins.

An adhesive resin layer may be used between the core layer and the outer layers. Suitable resins for the adhesive layer include thermoplastic polymers containing carboxyl group or their derivatives, such as copolymer of polyolefin graft modified with maleic acid anhydride or adipic acid polyesters containing urethane bonding.

The film obtained from the present invention can be used as a food packaging film. It is particularly suitable as a packaging material for cheese products, coffee beans and the like, because such film has a low $O_2$ GTR and a high $CO_2/O_2$ GTR ratio.

The present invention is further illustrated and explained by the following examples:

EXAMPLE

The Method for Measuring Softening Temperature and Yield Stress

Pellets of the thermoplastic resin being tested were formed into a sheet having a thickness of 100 μm by a hot press machine under a pressure of 100 Kg/cm$^2$ at 220° C. for 1 minute after pre-heating for 3 minutes at 220° C.

Softening temperature of the obtained sheet, as a specimen, was measured according to the method of JIS K7196 using a TMA (Thermo Mechanical Analyzer; TMA 40 made by Mettler Co. Ltd.), in which the sheet was heated at an increasing rate of the temperature of 10° C./min. Softening temperature was obtained from the TMA curve according to JIS K7196. The rod was loaded with a weight of 0.02N and had a diameter of 1 mmϕ at the tip face of the rod.

Yield stress was measured according to the method of JIS K7127. EVOH resin and a predetermined amount of each thermoplastic resin were dry blended, then each dry blend was melt kneaded by a single screw extruder which was equipped with a water cooling type pelletizer and formed into a pellet. The thus obtained pellet was formed into a sheet by the same method as mentioned above. The stress-strain curve of the sheet was obtained using a tensile strength meter (TENSILON:RTM-100, made by TOYO BALDWIN Co. Ltd.), in which the sheet was tested for tensile strength heated at 90° C. for 10 seconds. The speed of testing was 500 mm/min. The yield stress of the sheet was obtained from the stress-strain curve as described in JIS K7127.

The Method for Measuring Oxygen Gas Transmission Rate $O_2$ GTR was measured at 23° C., in 80% RH, using an oxygen gas transmission testing apparatus OX-TRAN 2/20 (manufactured by MODERN CONTROL Co. Ltd.).

The Method for Measuring Carbon Dioxide Gas Transmission Rate $CO_2$ GTR was measured at 23° C., in 80% RH, using a carbon dioxide gas transmission testing apparatus PERMATRAN C-IV (manufactured by MODERN CONTROL Co. Ltd.).

The Method for Evaluating Film Stretchability

The parison having a core layer comprising the resin composition of the present invention was heated in hot water at 87° C. for 15 seconds, and then the parison was immediately stretched by inflating to 2.3×2.3 times, respectively, in the machine and the transverse directions to obtain a laminated multilayered film. The state in which the parison was inflated into a laminated multilayered film was visually inspected and evaluated as follows:

o: the bubble formed was stable and a continuous film forming operation was possible for more than an hour without trouble.

Δ: the bubble burst not more than 2 times an hour during the film forming operation.

x: the bubble burst not less than 3 times an hour and a continuous film forming operation was not possible.

REFERENCE EXAMPLE 1 to 5 and REFERENCE COMPARATIVE EXAMPLE 1

EVOH (ethylene content=29 mole %, degree of saponification: 99.4 mole %, melting point: 180° C., and melt viscosity at 210° C. and a shear rate of $10^2 sec^{-1}=1.0\times10^4$, manufactured by Kurare Co., Ltd.) and five kinds of thermoplastic resins shown in Table 1 were respectively dry blended according to the blend ratio shown in Table 2. The blends were then melt kneaded by a single screw extruder which was equipped with a water cooling type pelletizer and formed into pellets. The obtained pellet was formed into a sheet having a thickness of 100 μm by the hot press machine under a pressure of 100 Kg/cm$^2$ at 220° C. for 1 minute after pre-heating for 3 minutes at 220° C.

The obtained sheet was used as the sample for measuring the yield stress of the sample. The stress-strain curve was obtained by using a tensile strength meter mentioned above. The yield stress values of these samples (as Reference Example 1 to 5) and the value of EVOH alone (as Reference Comparative Example 1) were shown in Table 2.

EXAMPLE 1 to 7, and COMPARATIVE EXAMPLE 1

EVOH (ethylene content=29 mole %, degree of saponification: 99.4 mole %, melting point: 180° C., and melt viscosity at 210° C. and a shear rate of $10^2 sec^{-1}=1.0\times10^4$, manufactured by Kurare Co., Ltd.) and the five thermoplastic resins of Table 1 were dry blended respectively according to the blend ratio shown in Table 3 by a single screw extruder which was equipped with a water cooling type pelletizer and formed into a pellet (A).

Meanwhile, PVA (degree of saponification: 80 mole %, degree of polymerization: 500, manufactured by Kurare Co,. Ltd.) and PEG (average molecular weight: 600) were blended and the blend was formed into a pellet (B) by a twin screw extruder.

And then pellets (A) and pellets (B) were dry blended. The obtained dry blended pellet was used as a core layer. The dry blended pellet (for the core layer), a copolymer of ethylene and vinyl acetate resin (EVA) {Nucrel NUC8425, manufactured by Nippon Unicar Co,. Ltd.} (as an outer layer), Ionomer resin {Surlyn AM7910, manufactured by Mitui.Du'pont.Polychemical Co,. Ltd.} (as an inner layer), and an adhesive resin }"Admer" SE 800, Melt Index at 190° C.: 4.4, manufactured by Mitui Petrochemical Industries, Ltd.,} (as adhesive layers), were melt kneaded separately by extruders, and were melt coextruded by a coextruding apparatus with the resin temperature at 210° C.

Thus obtained parison was rapidly cooled, and heated in hot water at 87° C. for 15 seconds, and then stretched 2.3×2.3 times respectively in the machine and the transverse directions by air supplied into the tubular laminate to obtain a film constructed of five layers, namely, EVA layer/adhesive layer/core layer adhesive layer/Ionomer layer (the thickness: 10/2/20/2/30 μm).

Stretchability was evaluated by visual inspection, $CO_2$ GTR and $O_2$ GTR are shown in Table 3. The film comprising the resin composition which includes no thermoplastic resin (shown as Comparative Example 1) had a high stress during the stretching, and the bubble burst twice in an hour, so that the continuous film forming was difficult. On the other hand, the film containing the thermoplastic resin defined in the present invention exhibited improved stretchability and could be continuously film formed.

EXAMPLE 8 to 12 and COMPARATIVE EXAMPLE 2

EVOH (ethylene content=29 mole %, degree of saponification: 99.4 mole %, melting point: 180° C., and melt viscosity at 210° C. and shear rate of $10^2$ $sec^{-1}$=1.0×$10^4$, manufactured by Kuraray Co., Ltd.) and EEA-MAH (shown in Table 1) as the thermoplastic resin were dry blended according to the blend ratio shown in Table 4 by a single screw extruder which was equipped with a water cooling type pelletizer and formed into pellets. Meanwhile, PVA (degree of saponification: 80 mole %, degree of polymerization: 500, manufactured by Kurare Co,. Ltd.) and PEG (average molecular weight: 600) were blended and the blend was formed into pellets by a twin screw extruder. And thus obtained pellets were dry blended with the previously obtained pellets.

A five layer stretched film was prepared using the same procedure as employed in Example 1, except that the dry blended resin was used a core layer. Stretchability evaluated, by visual inspection, $CO_2$ GTR and $O_2$ GTR are shown in Table 4.

It can be seen from Table 4 that the $O_2$ GTR of this laminated film decreased if the ratio of EVOH content in the resin composition of the present invention increases. When the resin composition contained no EVOH and a thermoplastic resin is used, the desired laminated film having a $O_2$ GTR of not more than 500 cc/$m^2$.day.atm (23° C., at 80%RH) was not obtained.

Melt extruded articles or stretched articles which are obtained from the resin composition of the present invention exhibit stretchability characteristics as shown in the film forming process or the tray forming process. The film obtained from the resin composition of the present invention is particularly suitable as a packaging material for foods which generate $CO_2$ gas and are apt to deteriorate easily by $O_2$ gas such as cheese products, coffee beans and the like, because these films have a low $O_2$ GTR and a high $CO_2/O_2$ GTR ratio.

TABLE 1

| Resins | Softening Temperature | Name of Commodities | Manufacturer |
|---|---|---|---|
| Ionomer modified with polyamide (PA-Ionomer) | 128° C. | TF-3239-3 | Du'pont-Mitsui Polychemicals Co., Ltd. |
| copolymer of styrene-isoprene-styrene elastomer (SIS) | 108° C. | Cariflex TR-1107P | Shell Chemicals Co., Ltd. |
| copolymer of ethylene and vinyl acetate (EVA) | 102° C. | NUC8425 | Nippon Unicar Co., Ltd. |
| copolymer of ethylene and acrylic acid (EAA) | 105° C. | Escor TR5001 | Exxon Co., Ltd |
| copolymer of ethylene and ethylacrylate grafted with maleic anhydride (EEA-MAH) | 92° C. | N-Polymer A1600 | Nippon Petroleum Chemicals Co., Ltd. |

TABLE 2

| Reference Example | Blend ratio (% by weight) | | | Yield Stress*2 (Mpa) |
|---|---|---|---|---|
| | EVOH | thermoplastic resins*1 | | |
| 1 | 26 | PA-Ionomer | 5 | 15 |
| 2 | 26 | SIS | 5 | 14 |
| 3 | 26 | EVA | 5 | 13 |
| 4 | 26 | EAA | 5 | 13 |
| 5 | 26 | EEA-MAH | 5 | 13 |
| Comparative Reference Example 1 | EVOH alone | | 0 | 20 |

*1; Abbreviation of thermoplastic resins is used according to Table 1.
*2; The yield stress was obtained from the stress-strain curve as the manner described in JIS K7127.

TABLE 3

| Examples | resin composition of core layer (% by weight) | | | | *2 | *2 | $CO_2/O_2$ | *3 |
|---|---|---|---|---|---|---|---|---|
| | PVA | EVOH | thermoplastic resin*1 | | PEG | $CO_2$ GTR | $O_2$ GTR | GTR ratio | stretchability |
| 1 | 60 | 26 | PA-Ionomer | 5 | 9 | 3300 | 220 | 15 | ◯ |
| 2 | 60 | 26 | SIS | 5 | 9 | 4500 | 300 | 15 | ◯ |
| 3 | 60 | 26 | EVA | 5 | 9 | 4050 | 270 | 15 | ◯ |
| 4 | 60 | 26 | EAA | 5 | 9 | 3750 | 250 | 15 | ◯ |
| 5 | 60 | 26 | EEA-MAH | 5 | 9 | 3600 | 240 | 15 | ◯ |
| 6 | 59 | 25 | EEA-MAH | 8 | 8 | 4950 | 330 | 15 | ◯ |

TABLE 3-continued

| Examples | resin composition of core layer (% by weight) | | | | *2 CO$_2$ GTR | *2 O$_2$ GTR | CO$_2$/O$_2$ GTR ratio | *3 stretchability |
| --- | --- | --- | --- | --- | --- | --- | --- | --- |
| | PVA | EVOH | thermoplastic resin*1 | PEG | | | | |
| 7 | 58 | 24 | EEA-MAH | 10 | 8 | 4500 | 300 | 15 | ○ |
| Comparative Example 1 | 64 | 27 | — | 0 | 9 | 3200 | 180 | 15 | Δ |

*1; Softening temrperatures are shown in Table 1.
*2; The unit of GTR; cc/m$^2$ · day · atm. (23° C. at 80% RH).
*3; The evaluation was done according to the method described in the "Example".

TABLE 4

| Examples | resin composition of core layer (% by weight) | | | | *2 CO$_2$ GTR | *2 O$_2$ GTR | CO$_2$/O$_2$ GTR ratio | *3 stretchability |
| --- | --- | --- | --- | --- | --- | --- | --- | --- |
| | PVA | EVOH | thermoplastic resin*1 | PEG | | | | |
| 8 | 76 | 11 | EEA-MAH | 2 | 11 | 6000 | 400 | 15 | ○ |
| 9 | 68 | 19 | EEA-MAH | 3 | 10 | 3750 | 250 | 15 | ○ |
| 10 | 60 | 26 | EEA-MAH | 5 | 9 | 2550 | 170 | 15 | ○ |
| 11 | 55 | 31 | EAA-MAH | 6 | 8 | 1950 | 130 | 15 | ○ |
| 12 | 52 | 34 | EAA-MAH | 7 | 7 | 1650 | 110 | 15 | ○ |
| Comparative Example 2 | 88 | — | — | 0 | 12 | 10800 | 720 | 15 | ○ |

*1; Softening temrperatures are shown in Table 1.
*2; The unit of GTR; cc/m$^2$ · day · atm. (23° C., at 80% RH).
*3; The evaluation was done according to the method described in the "Example".

What is claimed is:

1. A resin composition comprising:
   (a) from 40 to 80% by weight of a polyvinylalcohol resin (A) having a degree of saponification value of from 60 to 95 mol %;
   (b) form 5 to 40% by weight of a saponified copolymer of ethylene and vinyl acetate (B);
   (c) from 1 to 15% by weight of a thermoplastic resin (C) having a softening temperature not higher than 130° C. and selected from the group consisting of an acid-grafted or acid anhydride grafted polyethylene, polypropylene, a copolymer of ethylene and vinyl acetate, a copolymer of ethylene and acrylic acid, a copolymer of ethylene and ethylacrylate, and an ionomer grafted with a polyamide; and
   (d) from 5 to 15% by weight of a polyethylene glycol (D).

2. A resin composition according to claim 1, wherein the yield stress at 90° C. of a mixed resin of the saponified copolymer of ethylene and vinyl acetate (B) and the thermoplastic resin (C) having a softening temperature not higher than 130° C. is not more than 85% of the value of said saponified copolymer of ethylene and vinyl acetate (B) alone.

3. A melt-extruded article comprising at least one layer including a resin composition according to claim 1.

4. An oriented article comprising at least one layer including a resin composition according to claim 1.

5. An oriented article comprising at least one layer including a resin composition according to claim 1 and having a thickness of 2 to 50 μm.

6. An article selected from a film, a sheet or a tray according to claim 3.

7. An article selected from a film, a sheet or a tray according to claim 4.

8. A packaging material for food comprising an article according to claim 6.

9. A packaging material for food according to claim 8, where said food is a cheese product.

10. A process for producing a resin composition comprising
   (a) from 40 to 80% by weight of a polyvinylalcohol resin (A) having a degree of saponification value of from 60 to 95 mole %;
   (b) from 5 to 40% by weight of a saponified copolymer of ethylene and vinyl acetate (B);
   (c) from 1 to 15% by weight of a thermoplastic resin (C) having a softening temperature not higher than 130° C.; and
   (d) from 5 to 15% by weight of a polyethylene glycol (D) comprising the steps of:
      (1) mixing said saponified copolymer of ethylene and vinyl acetate (B) and said thermoplastic resin (C) to form a mixture; and then
      (2) adding the mixture formed in step (1) to said polyvinylalcohol resin (A) and said polyethylene glycol (D) or a mixture of (A) and said polyethylene glycol (D).

* * * * *